United States Patent [19]

Viering

[11] 4,201,458
[45] May 6, 1980

[54] SINGLE LENS MIRROR REFLEX STUDIO CAMERA IN WHICH QUICK RETURN MIRROR CLOSES FLASH CONTACT

[75] Inventor: Rudolf Viering, Cologne, Fed. Rep. of Germany

[73] Assignee: Pixyfoto GmbH, Cologne, Fed. Rep. of Germany

[21] Appl. No.: 878,107

[22] Filed: Feb. 15, 1978

[30] Foreign Application Priority Data

Feb. 17, 1977 [DE] Fed. Rep. of Germany ....... 2706734

[51] Int. Cl.² .................. G03B 15/03; G03B 19/12
[52] U.S. Cl. .................................. 354/136; 354/152
[58] Field of Search ............. 354/136, 139, 147, 152, 354/156, 154

[56] References Cited

U.S. PATENT DOCUMENTS

| 666,006 | 1/1901 | Fraley | 354/156 |
|---|---|---|---|
| 2,029,238 | 1/1936 | Korling | 354/136 |
| 3,404,615 | 10/1968 | Proffitt | 354/156 |
| 3,442,192 | 5/1969 | Sato | 354/156 |
| 3,533,343 | 10/1970 | Kobayashi et al. | 354/156 |
| 3,628,436 | 12/1971 | Sato | 354/156 |
| 3,641,898 | 2/1972 | Kawahara | 354/156 |
| 3,738,246 | 6/1973 | Sato | 354/152 |
| 3,785,270 | 1/1974 | Schiff et al. | 354/156 X |
| 3,810,691 | 5/1974 | Seiden | 354/152 X |
| 3,955,206 | 5/1976 | Hashimoto | 354/152 |
| 3,961,343 | 6/1976 | Shono | 354/156 |

FOREIGN PATENT DOCUMENTS

| 238984 | 6/1960 | Australia | 354/136 |
|---|---|---|---|
| 93025 | of 1923 | Fed. Rep. of Germany | 354/152 |
| 1208186 | of 1965 | Fed. Rep. of Germany | 354/152 |
| 349591 | of 1907 | France | 354/152 |
| 387436 | of 1965 | Switzerland | 354/152 |
| 8070 | of 1895 | United Kingdom | 354/152 |

Primary Examiner—L. T. Hix
Assistant Examiner—Shelley Wade
Attorney, Agent, or Firm—Ladas, Parry, Von Gehr, Goldsmith & Deschamps

[57] ABSTRACT

This invention relates to a single-lens mirror reflex camera for studio purposes, with which the exposure-determining film exposure, within a prescribed opening time of the shutter, is effected during the duration of a flashlight initiated by the camera. A shutter cap is provided which is formed as a swivellable, light-tight return swinging mirror. Such cap is fixed on a driveable shaft, and is held by means of a return spring in the rest position completing the optical system of the viewfinder. The cap also carries at least one contact element of a control switch for the flashlight, of which the coacting contact is arranged on a stop limiting the open position.

8 Claims, 5 Drawing Figures

SINGLE LENS MIRROR REFLEX STUDIO CAMERA IN WHICH QUICK RETURN MIRROR CLOSES FLASH CONTACT

The invention relates to a single-lens mirror reflex camera for studio purposes, with which the exposure-determining film exposure within a prescribed time when the shutter is open is effected during the period of a flashlight initiated by the camera.

Such studio cameras therefore always operate with flashlight exposure and are designed for the purpose of producing series exposures, more especially of small children. For this purpose, the known, normal commercial mirror reflex cameras or at least the constructional forms thereof are normally used. The known mirror reflex cameras are for the major part equipped with focal-plane shutters or with between-lens shutters. After the camera release member has been actuated, but still before the initiation of the exposure, it is necessary with a mirror reflex camera having a focal-plane shutter to fulfill two functions, which are namely the swinging of the viewing mirror out of the path of rays and the closing of the objective diaphragm or aperture to a previously selected value. As regards the mirror reflex camera having a between-lens shutter, there are also two additional functions, namely, the closing of the shutter blades which are opened while the image is being viewed and the swinging away of a light hood which is disposed in front of the image window or aperture.

The shutters of these known cameras are designed for a relatively large number of exposure times which can be selected and which are graduated as a function of time, so that the quantity of light required for the exposure is capable of being incident on the film in combination with the diaphragm aperture. However, if the exposure is always effected with the assistance of a flashlight source, the actual time of opening of the shutter loses its decisive importance. It is only necessary during the flash exposure to ensure that the shutter is completely opened.

It has now been established that the known cameras are not equal to the high standards in connection with constant use of the camera, as for example with photographic studios for taking photographs of children or for similar purposes. It is more especially with the mechanically moving parts that functional disruptions occur, which make necessary frequent replacements of the parts concerned when the camera is constantly used for the purpose in question. It has moreover been established that particularly unskilled personnel find it difficult to operate the known mirror reflex cameras. Using such cameras, the photographer is deflected from his purpose of concentrating solely on the subject to be photographed, which in this case is therefore small children.

It is the object of the invention to avoid these disadvantages of the known mirror reflex cameras and to provide a camera for a studio in established premises and for mobile studios, which camera is of a robust construction and is very simple to operate, and with which more especially the wear on moving parts is reduced to a minimum and which is to be of simple construction and easy to maintain. This object is achieved by a shutter cap which is formed as a swivellable, light-right return swinging mirror, the said cap being fixed on a driveable shaft, is held by means of a return spring in the rest position completing the optical system of the viewfinder and carries at least one contact element of a control switch for the flashlight, of which the coacting contact is arranged on a stop limiting the open position.

It is an advantage of such a camera that the mechanical parts which are to be moved are reduced to a minimum and in addition can be made in a decisively stable form, so that, while being of very simple construction, a hitherto unexpected long operative life and reliability is produced. It has surprisingly been found that, also when using relatively rigid and bulky components and with an intended departure from the precision mechanics usual in the construction of cameras, it has been possible to provide a mirror reflex camera which is not in any way inferior as regards its results to the known cameras.

To construct shutter and deflecting mirrors of the single-lens mirror reflex camera as a shutter cap with a reflecting mirror surface is only possible with apparatus which operate exclusively with flashlight and with which the incidence of extraneous light is small during the time that the shutter is opened. Because of the high illumination intensity of the flash and of the small diaphragm aperture which thereby is possible, the shutter is however only able to swing slowly and also carry the weight of the mirror.

By the specific arrangement of the control contacts for the flashlight, it is guaranteed that the flash exposure is only able to occur when the shutter cap is in the completely open position. As a consequence, a reliable synchronization between shutter cap and flashlight is always guaranteed. It has been found that, by using a shutter cap which is solid and of very robust construction and which, because of its weight, makes necessary very high acceleration forces, and as a departure from the conventional constructional principles involving precision mechanics for cameras, it is possible to achieve shutter opening times with which any incidence of extraneous light can be disregarded.

The stop or abutment advantageously comprises a soft, elastomeric support and the coacting contacts are fixed on this support. The effect which is hereby achieved is that, even with relatively large, moving weights and with the braking of the shutter cap, the camera is not too greatly vibrated. As the same time, a damping of the noise is achieved and blurred exposures are avoided.

It is further proposed that energy for movement purposes is only supplied to the shutter cap in the initial stage of the swinging movement. The drive means is thus already disconnected before the shutter cap strikes against the support. By this means, a particularly favorable movement of the shutter cap is obtained. Because of the forces due to inertia of the cap and the rotating driving parts, the cap moves still further in the opening direction until it strikes against the buffered stop and as a result, with reversal of its direction of movement, is once again projected back into the closed position. The return movement is here assisted by the return spring. Using conventional components, shutter exposures of 1/75 second can be obtained.

The camera according to the invention is thus only suitable for flashlight exposures, since an exposure with continuous light would always lead to a different exposure of individual film zones, because of the particular construction of the shutter cap.

One constructional example of the invention is illustrated in the drawing and is hereinafter more fully described.

Figure 1:
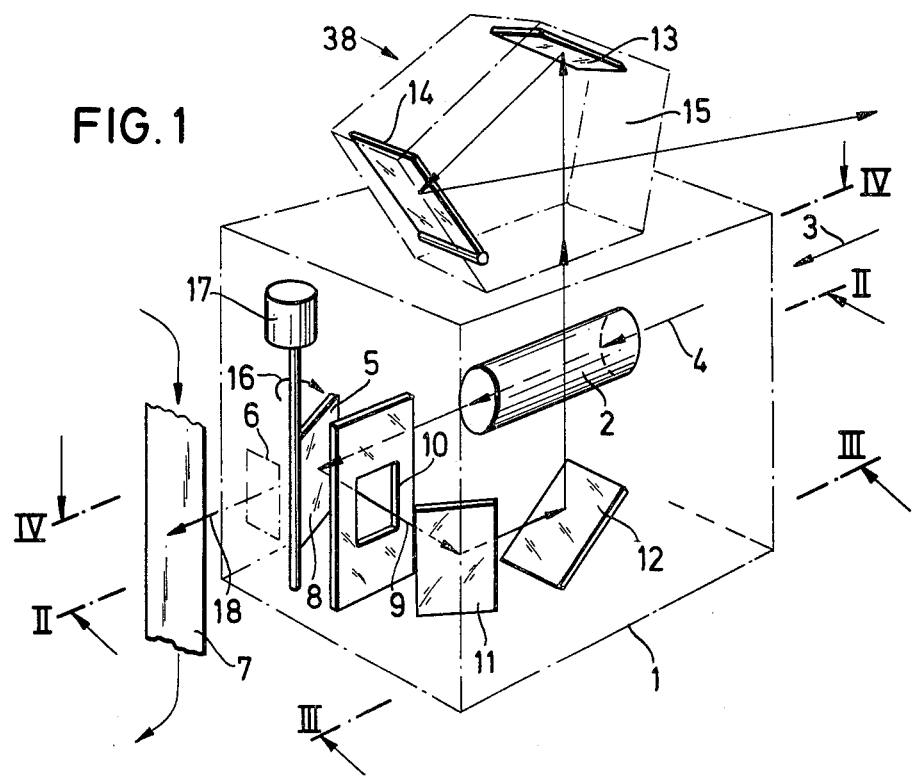
FIG. 1 is a perspective view showing the principle of the camera.

A view of the camera which represents the principle of the invention is shown in FIG. 1. The light from the subject of the photograph is incident on the objective 2 approximately along the directional arrow 3 extending along the optical axis 4. This objective 2 also has disposed therein the diaphragm, which is in the form of a spring diaphragm. Th position of the shutter cap 5 is so chosen in FIG. 1 that the path of rays of the viewfinder is completed.

After being reflected on the mirror surface 8, the light passes in the direction of the directional arrow 9 through the image diaphragm or aperture 10, in the plane of which is situated the image plane of the subject. This intermediate image is deflected several times by means of four plane mirrors 11 to 14 and is in turn somewhat enlarged and concentrated by means of several optical lenses 27,28, which are not shown in FIG. 1. The light which originates from the subject leaves the camera at the outlet window 15 of the viewfinder attachment 38. The person looking into the path of rays sees an upright, reduced image of the subject which is not reversed laterally.

Since the objective 2 is equipped with a spring diaphragm, which only springs just prior to the exposure of the film to the preselected diaphragm aperture and always presents the largest possible diaphragm opening in the rest position, the viewing photographer also sees a bright image.

If the shutter cap 5 is swung in the direction of the arrow 16 indicating the direction of rotation by means of a driving arrangement, which is in the form of a rotary electromagnet 17 in the constructional example as illustrated, so that the said cap comes into a position approximately parallel to the image aperture 10, then the optical path to the film 7 becomes free. The light originating from the subject to the photographed then passes rectilinearly according to the directional arrow 18 and through the image aperture 6 onto the film 7. The image of the subject to be recorded lies in the plane of this film 7.

As objective 2, it is advantageous to employ an objective having an infinitely variable focal length, such objectives being frequently referred to as zoom objectives. In the constructional example as illustrated in FIG. 1, the film 7 is an unperforated 35 mm miniature film.

Figure 2:
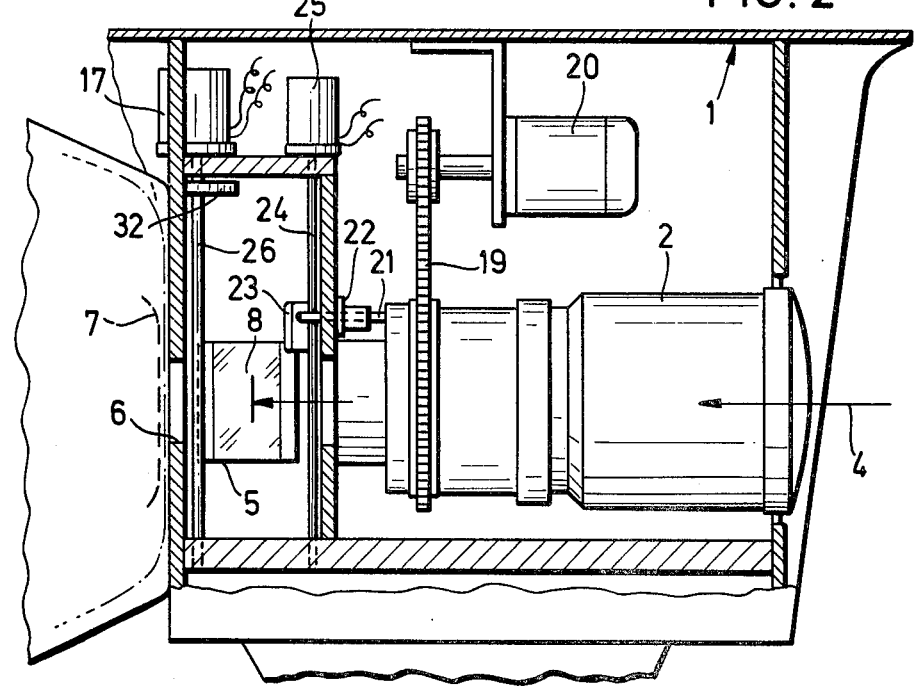
FIG. 2 is a sectional view through the camera, along the section lines II—II in FIG. 1.

Individual details as regards construction are to be seen from FIG. 2. As will be apparent from this figure, the objective 2 is entirely arranged in the camera housing 1, so that it is particularly protected. Since the distance as regards the subject when the mirror reflex camera is used in the manner as described is always constant (fixed focus), any range or distance setting becomes superfluous. Accordingly, the focal length is changed and adjusted by motor means on the objective itself, solely by means of a linked chain 19 and an electric motor 20.

In addition, an actuating device 21 of the spring diaphragm projects in the form of a plunger from the objective 2. The said plunger is guided in a guideway 22 and terminates in the vicinity of a tab or lug 23, which is connected to the shaft 24 of the rotary electromagnet 25 so as positively to rotate therewith. If this rotary electromagnet 25 is energized by supply of current, the tab 23 swings on to the free end of the plunger 21, applies pressure to the latter and as a result frees the spring disphragm in the objective 2. The said diaphragm accordingly springs from its largest aperture position into a prescribed diaphragm position. In the drawing, the spring diaphragm is open.

As in FIG. 1, the shutter cap 5 with a mirror surface 8 is also shown in FIG. 2 in the rest position. In this position, the rays which are incident parallel to the optical axis 4 of the objective reach the mirror surface 8 at an angle of about 45° and are reflected, emerging perpendicularly from the plane of the paper in FIG. 2. The shutter cap 5 is connected to the shaft 26 so as to rotate positively therewith. This shaft 26 is in turn driven by the rotary electromagnet 17.

The electric circuit for energizing the two rotary electromagnets 17, 25 is so designed in known manner that when the release member of the camera is actuated, first of all the rotary electromagnet 25 of the spring diaphragm is energized and it is only thereafter that the rotary electromagnet 17 for the shutter cap 5 is energized. As a consequence, it is always guaranteed that the spring diaphragm has assumed the preselected value before the initiation of the opening of the shutter cap and extraneous light can be incident on the film 7. On account of the high illumination density of the electronic flash which is always used for the exposure, the spring diaphragm assumes a relatively small diaphragm aperture as soon as it is actuated. As a consequence, the incidence of extraneous light is however small, so that in practice there is no light exposure of the film by outside light during the time when the shutter cap 5 is being opened.

Figure 3:
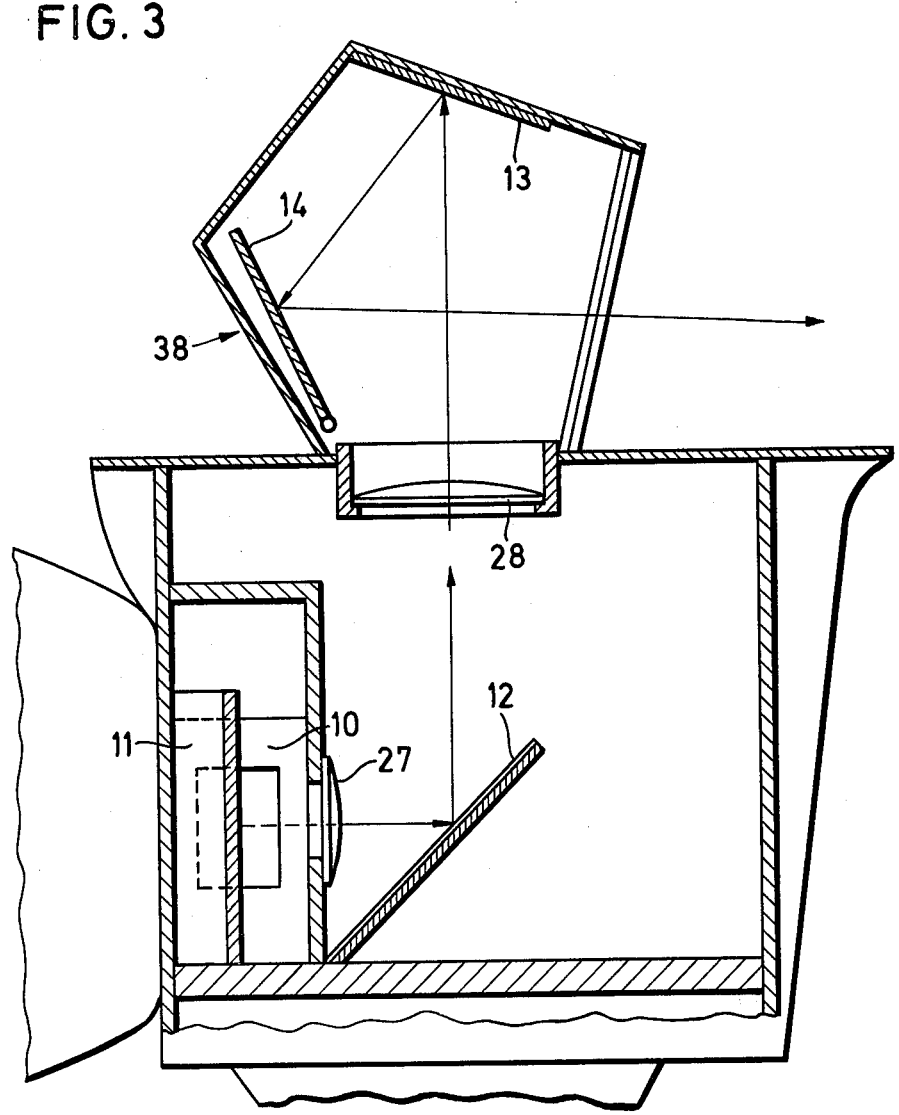
FIG. 3 is a sectional view along the section line III—III in FIG. 1.

FIG. 3 represents the path of rays of the viewfinder. After having passed through the image diaphragm 10, the light which is reflected on the plane mirrors 11, 12, 13 and 14 emerges at the exit window 15. The magnification of the image which is present within the image diaphragm 10 to approximately the dimension of the exit window 15 is achieved by means of three optical lenses, the field lens 27, the ocular 28 and the front lens 37. The suitable choice of the focal lengths of these lenses 27, 28 and 31 determines the required magnification or enlargement of the image. With the disposition of the path of rays of the viewfinder as shown herein, a photographer is able to look into the said ray path from the subject side, and thus, while he is still occupied with the small child to be photographed, always to keep the viewfinder image—as a so-called air image—in view. The light emerging from the exit window 15 of the viewfinder attachment 38 thus passes laterally by the subject to be photographed. The viewfinder attachment 38 may here by arranged to be swivellable on the camera housing 1 through a small angle relatively to said housing.

Figure 4:
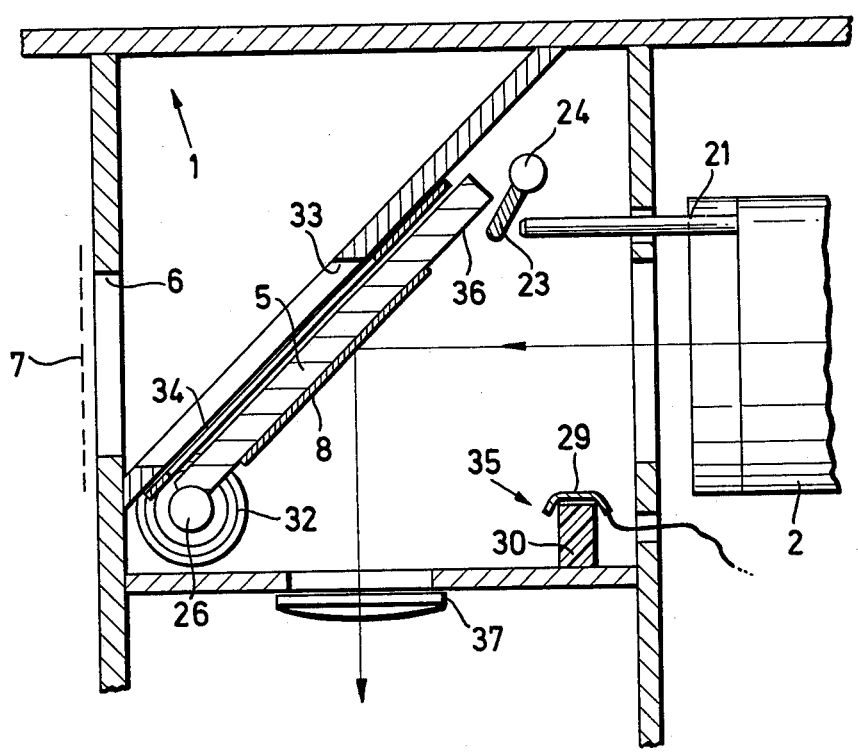
FIG. 4 is a sectional view along the section line IV—IV in FIG. 1, with the shutter cap closed.
Figure 5:
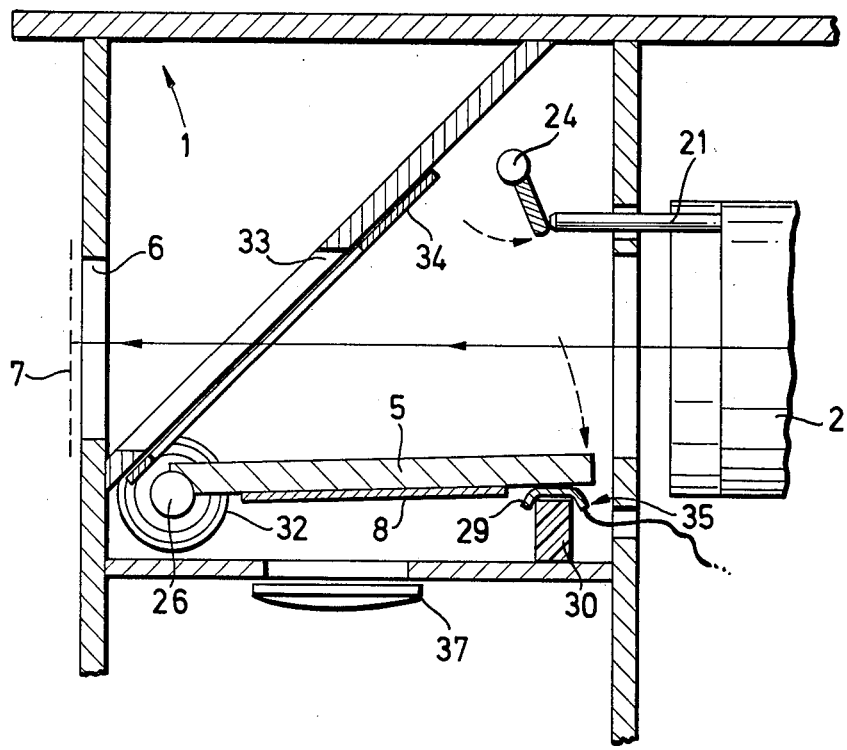
FIG. 5 is a view corresponding to FIG. 4, but with the shutter cap open.

Other details of the camera according to the invention will be apparent from FIGS. 4 and 5 and more especially it is possible from these figures to see the arrangement of the contacts for synchronizing the flashlight. In the position as shown in FIG. 4, the shutter cap 5 is disposed in its rest position. It is held by the return spring 32 in this rest position and thereby bears resiliently against the window 33. Light which is incident through the objective is deflected into the path of rays of the viewfinder when the shutter cap 5 is in the position as shown.

After actuating the camera release member, first of all the lug 23 on the shaft 24 swivels in the direction of the arrow 31 indicating the direction of rotation onto the free end of the plunger 21 and thus actuates the spring diaphragm. At the same time, the path of movement for the shutter cap 5 is thereby freed. Increased in time with respect to this movement, the rotary electromagnet 17 for the shutter cap 5 is pulled on, so that the path of rays is freed, as an extension of the optical axis 4 of the objective 2, onto the film 7. The rotary drive means for the shutter cap 5 are expediently so controlled that energy for movement purposes is only supplied with the commencement of the hingeing movement.

As the swivelling or hingeing movement continues, the shutter cap 5, because of the inertia of its weight, swings still further until it strikes against the stop 35, which is formed of a coacting contact 29 and support 30. By means of the elastic support 30, which preferably is made of soft and elastic synthetic plastic foam material, the mechanical movement of the shutter cap 5 is softly taken up and deflected into the opposite direction. At the same time, however, the shutter cap 5 is bearing against the coacting contact 29. In the constructional example as illustrated in FIGS. 4 and 5, the shutter cap is electrically connected to earth potential, whereas the coacting contact 29 is arranged insulated from earth potential. By means of the cap 5 and the coacting contact 29, and other devices which are not shown in the figures, it is thereby possible to obtain a control signal for initiating the flashlight.

The return swinging movement of the shutter cap 5 is assisted by the return spring 32. The camera is so designed that first of all the shutter cap 5 substantially reaches its rest position before the mechanism of the spring diaphragm is again freed by means of the lug 23. Throughout the entire period when the cap 5 is open, the preselected diaphragm value of the spring diaphragm is thus maintained. The opening position of the cap amounts to about 1/75 second.

The rotary electromagnets 17, 25 are each expediently energized by a charged capacitor of adequate capacitance, of which the stored charge is always sufficient for moving the rotary electromagnets 17, 25 and associated mechanical parts. In known manner, the storage capacitor is normally connected to the charging circuit, but as soon as the capacitor is to be connected in parallel with the coils of the rotary electromagnets 17, 25, the capacitor is automatically separated from the charging circuit.

In the constructional example which is represented in respect of the camera according to the invention, the driving means for the shutter cap 5 and spring diaphragm are in the form of rotary electromagnets 17, 25. However, other possible driving means may also be used, for example, a solenoid for actuating the spring diaphragm, a delay-action electric motor with a coupling means or the like.

I claim:

1. In a single lens mirror reflex camera for studio use in which exposure of the film is synchronized with activation of a flashbulb and in which a mirror is movable from a focusing to a picture-taking position, wherein the improvement comprises the following features:
   (a) the movable mirror is carried on a shutter cap;
   (b) the movable mirror and shutter cap are mounted on a shaft driven by a rotary electromagnet;
   (c) a return spring assists movement of said shaft from the picture-taking position to the focusing position in which the shutter is closed;
   (d) the mirror carries a first contact which in the picture-taking position touches a second contact to activate the flashbulb;
   (e) the second contact is mounted on an elastic support;
   (f) the arrangement being such that the movable mirror, as soon as the first contact has touched the second contact and the flashbulb has been initiated, is immediately returned to its position of rest where the shutter is closed, this return movement being assisted by deformation of the elastic support and the return spring.

2. Mirror reflex camera according to one of claims 1, characterized in that the shutter cap, in the rest position, bears against a soft, light-sealing packing strip arranged on a window.

3. Mirror reflex camera according to claim 1, characterized in that the rotary electromagnet is capable of being connected by both poles to a charged capacitor.

4. Mirror reflex camera according to claim 1, characterized by an objective with a spring diaphragm, the actuating means of which are connected to a rotary electromagnet by way of a tab or lug fixed on a pivotable shaft.

5. Mirror reflex camera according to claim 4, characterized in that the release contact of the camera is electrically connected directly to the energizing circuit of the rotary electromagnet and by way of a time-delay member to the energizing circuit of the rotary electromagnet of the shutter cap.

6. Mirror reflex camera according to claim 5, characterized in that the lug, in its rest position, projects into the turning circle of the shutter cap in the vicinity of the rest position of the said cap and is located outside this turning circle in its operating position.

7. Mirror reflex camera according to claim 1, characterized in that the light emerging from an exit window of a viewfinder attachment and originating from the subject to be photographed is directed and passes laterally by the said subject.

8. Mirror reflex camera according to claim 7, characterized in that the viewfinder attachment is swivellable by an angle smaller than 30° relatively to the optical axis of the objective.

* * * * *